United States Patent
Koo et al.

(10) Patent No.: US 8,917,801 B2
(45) Date of Patent: Dec. 23, 2014

(54) METHOD OF DEMODULATING MDCM SIGNAL USING HARD DECISION AND METHOD OF DEMODULATING MDCM SIGNAL USING SOFT DECISION

(71) Applicants: Samsung Electronics Co., Ltd., Suwon-si (KR); Yonsei University Office of Research Affairs, Seoul (KR)

(72) Inventors: Ji Hun Koo, Hwaseong-si (KR); Kil Hwan Kim, Seoul (KR); Jang Yong Park, Seoul (KR); Jae Seok Kim, Seoul (KR)

(73) Assignees: Samsung Electronics Co., Ltd., Suwon-Si, Gyeonggi-Do (KR); Yonsei University Office of Research Affairs, Seoul (KR)

( * ) Notice: Subject to any disclaimer, the term of this patent is extended or adjusted under 35 U.S.C. 154(b) by 128 days.

(21) Appl. No.: 13/644,574

(22) Filed: Oct. 4, 2012

(65) Prior Publication Data

US 2013/0089121 A1   Apr. 11, 2013

(30) Foreign Application Priority Data

Oct. 6, 2011   (KR) .......................... 10-2011-0101935

(51) Int. Cl.
| | |
|---|---|
| H04L 27/06 | (2006.01) |
| H04B 1/709 | (2011.01) |
| H04L 25/06 | (2006.01) |
| H04L 27/38 | (2006.01) |
| H04L 27/26 | (2006.01) |

(52) U.S. Cl.
CPC ............... *H04L 27/06* (2013.01); *H04B 1/709* (2013.01); *H04L 25/067* (2013.01); *H04L 27/38* (2013.01); *H04L 27/2649* (2013.01)

USPC .......................................................... 375/340

(58) Field of Classification Search
CPC .................................................... H04L 25/067
USPC .......................................................... 375/340
See application file for complete search history.

(56) References Cited

U.S. PATENT DOCUMENTS

| | | | |
|---|---|---|---|
| 7,773,500 B2 | 8/2010 | Oh et al. | |
| 2010/0034323 A1* | 2/2010 | Stoye | 375/341 |
| 2010/0183089 A1 | 7/2010 | Vasil'Evich et al. | |
| 2013/0272387 A1* | 10/2013 | Song et al. | 375/240.03 |

FOREIGN PATENT DOCUMENTS

| | | |
|---|---|---|
| JP | 4295012 | 7/2009 |
| KR | 100848057 | 7/2008 |

* cited by examiner

*Primary Examiner* — Tanmay Shah
(74) *Attorney, Agent, or Firm* — F. Chau & Associates, LLC

(57) ABSTRACT

A method of demodulating a modified dual carrier modulation (MDCM) signal using hard decision includes generating real symbol vector candidates and imaginary symbol vector candidates which correspond to an MDCM signal pair; calculating a first norm between a real part of the MDCM signal pair and each of the real symbol vector candidates and determining as a real symbol vector a real symbol vector candidate that has the minimum first norm among the real symbol vector candidates; and calculating a second norm between an imaginary part of the MDCM signal pair and each of the imaginary symbol vector candidates and determining as an imaginary symbol vector an imaginary symbol vector candidate that has the minimum second norm among the imaginary symbol vector candidates.

20 Claims, 7 Drawing Sheets

METHOD OF DEMODULATING MDCM SIGNAL USING HARD DECISION AND METHOD OF DEMODULATING MDCM SIGNAL USING SOFT DECISION

CROSS-REFERENCE TO RELATED APPLICATIONS

This application claims priority under 35 U.S.C. §119(a) from Korean Patent Application No. 10-2011-0101935 filed on Oct. 6, 2011, which is hereby incorporated by reference in its entirety.

BACKGROUND

1. Technical Field

Embodiments of the present inventive concept relate to a method of demodulating a modified dual carrier modulation (MDCM) signal, and more particularly, to an MDCM signal demodulation method for decreasing the complexity of MDCM signal demodulation by dividing a MDCM signal into a real part and an imaginary part and reducing the number of symbol vector candidates.

2. Description of the Related Art

Standards for a multiband-orthogonal frequency division multiplexing (MB-OFDM) ultra wideband (UWB) physical layer allows MDCM to be used for transmission at a high speed of 640 to 1024 Mbps.

The MDCM results from modifying conventional dual carrier modulation (DCM) to achieve high speed transmission. According to the MDCM, two independent 16-quadrature amplitude modulation (QAM) symbols are converted into two 256-QAM symbols, which are respectively transmitted over two subcarriers farthest from each other within an OFDM symbol.

When the MDCM is used, an MB-OFDM system can obtain diversity gain to overcome frequency selective fading without performance loss due to the increase in a modulation order.

Conventional techniques for demodulating MDCM signals at a receiving terminal include a maximum likelihood (ML) method, a zero-forcing (ZF) method, and a minimum mean square error (MMSE) method.

When the ML method is used, optimal performance can be provided theoretically but complexity is so high that the ML method is inappropriate to be applied to systems in practice. When the ZF method or the MMSE method is used, the complexity of a system can be decreased, but the performance of the system is deteriorated since diversity gain cannot be obtained.

The standards for the MB-OFDM UWB physical layer define that the MDCM is used together with low density parity check (LDPC) channel coding.

Accordingly, a receiver in an MB-OFDM system needs to carry out LDPC channel decoding. When soft decision demodulation is performed to increase reception performance, an MDCM demodulator needs to transmit an accurate log likelihood ratio (LLR) with respect to bits to an LDPC decoder since the LDPC channel decoding is carried out based on the LLR. When the ML method is used based on even soft decision, there is still a problem of system complexity. When the ZF method and the MMSE method are used, the LLR cannot be generated.

SUMMARY

According to some embodiments of the present inventive concept, there is provided a method of demodulating a modified dual carrier modulation (MDCM) signal using hard decision. The method includes generating real symbol vector candidates and imaginary symbol vector candidates which correspond to an MDCM signal pair; calculating a first norm between a real part of the MDCM signal pair and each of the real symbol vector candidates and determining as a real symbol vector a real symbol vector candidate that has a minimum first norm among the real symbol vector candidates; and calculating a second norm between an imaginary part of the MDCM signal pair and each of the imaginary symbol vector candidates and determining as an imaginary symbol vector an imaginary symbol vector candidate that has a minimum second norm among the imaginary symbol vector candidates.

The generating the real symbol vector candidates and the imaginary symbol vector candidates may include generating real values of constellation points to which the MDCM signal pair can be mapped as the real symbol vector candidates and generating imaginary values of the constellation points as the imaginary symbol vector candidates.

Alternatively, the generating the real symbol vector candidates and the imaginary symbol vector candidates may include calculating a second sub real symbol vector candidate having the minimum first norm among second sub real symbol vector candidates corresponding to the second MDCM signal in the MDCM signal pair with respect to each of first sub real symbol vector candidates corresponding to the first MDCM signal in the MDCM signal pair and generating the real symbol vector candidates based on a result of this calculation; and calculating a second sub imaginary symbol vector candidate having the minimum second norm among second sub imaginary symbol vector candidates corresponding to the second MDCM signal with respect to each of first sub imaginary symbol vector candidates corresponding to the first MDCM signal and generating the imaginary symbol vector candidates based on a result of this calculation.

The generating the real symbol vector candidates may include generating the real symbol vector candidates using $$S_r = \left\{ \Re\{s\} = [\Re\{s_0\}\Re\{s_1\}]^T \mid \Re\{s_0\} \in \{\pm 1, \pm 3\}, \right.$$

$$\left. \Re\{s_1\} = Q\left(\frac{(\Re\{z_0\} - 4\Re\{z_1\}) - 4\Re\{s_0\}(|h_0|^2 - |h_1|^2)}{|h_0|^2 + 16|h_1|^2}\right) \right\}$$

and the generating the imaginary symbol vector candidates may include generating the imaginary symbol vector candidates using $$S_i = \left\{ \Im\{s\} = [\Im\{s_0\}\Im\{s_1\}]^T \mid \Im\{s_0\} \in \{\pm 1, \pm 3\}, \right.$$

$$\left. \Im\{s_1\} = Q\left(\frac{(\Im\{z_0\} - 4\Im\{z_1\}) - 4\Im\{s_0\}(|h_0|^2 - |h_1|^2)}{|h_0|^2 + 16|h_1|^2}\right) \right\},$$

where $R\{s_0\}$ is a first sub real symbol vector candidate, $R\{s_1\}$ is a second sub real symbol vector candidate, $R\{z_0\}$ and $R\{z_1\}$ are real values of elements of $$\begin{bmatrix} z_0 & 0 \\ 0 & z_1 \end{bmatrix} = H^H \cdot y,$$

$h_0$ is a channel constant of a first subcarrier, $h_1$ is a channel constant of a second subcarrier, $Q(\ )$ is a slicing function, $I\{s_0\}$ is a first sub imaginary symbol vector candidate, $I\{s_1\}$ is a second sub imaginary symbol vector candidate, $I\{z_0\}$ and $I\{z_1\}$ are imaginary values of the elements of $$\begin{bmatrix} z_0 & 0 \\ 0 & z_1 \end{bmatrix} = H^H \cdot y.$$

The real symbol vector may be determined using $$\underset{\Re\{s\} \in S_r}{\mathrm{argmin}}(\Re\{s\}^T D^T (A\Re\{s\} - 2\Re\{z\}))$$

and the imaginary symbol vector may be determined using $$\underset{\Re\{s\} \in S_i}{\mathrm{argmin}}(\Im\{s\}^T D^T (A\Im\{s\} - 2\Im\{z\})),$$

where $A=H^H H D$ and $D$ is a precoding matrix.

The MDCM signal pair may have been modulated using 16-quadrature amplitude modulation (QAM), 256-QAM, or 256×256-QAM.

The method may be used in a multiband orthogonal frequency division multiplexing (MB-OFDM) ultra wideband (UWB) system.

The method may be used in a universal serial bus (USB) module.

According to other embodiments of the inventive concept, there is provided a method of demodulating an MDCM signal using soft decision. The method includes the (a) generating real symbol vector candidates and imaginary symbol vector candidates; (b) calculating a norm between a real part of an MDCM signal pair and each of the real symbol vector candidates and generating first calculation results; (c) calculating a norm between an imaginary part of the MDCM signal pair and each of the imaginary symbol vector candidates and generating second calculation results; and (d) calculating a log likelihood ratio for each of bits in the MDCM signal pair based on the first calculation results and the second calculation results.

The step (a) may include generating real values of constellation points to which the MDCM signal pair can be mapped as the real symbol vector candidates and generating imaginary values of the constellation points as the imaginary symbol vector candidates.

Alternatively, the step (a) may include calculating a second sub real symbol vector candidate having the minimum norm among second sub real symbol vector candidates corresponding to the second MDCM signal in the MDCM signal pair with respect to each of first sub real symbol vector candidates corresponding to the first MDCM signal in the MDCM signal pair and generating real symbol vector candidates based on a result of this calculation; calculating a first sub real symbol vector candidate having the minimum norm among the first sub real symbol vector candidates with respect to each of the second sub real symbol vector candidates and generating real symbol vector candidates based on a result of this calculation; calculating a second sub imaginary symbol vector candidate having the minimum norm among second sub imaginary symbol vector candidates corresponding to the second MDCM signal in the MDCM signal pair with respect to each of first sub imaginary symbol vector candidates corresponding to the first MDCM signal in the MDCM signal pair and generating imaginary symbol vector candidates based on a result of this calculation; and calculating a first sub imaginary symbol vector candidate having the minimum norm among the first sub imaginary symbol vector candidates with respect to each of the second sub imaginary symbol vector candidates and generating imaginary symbol vector candidates based on a result of this calculation.

As another alternative, the step (a) may include generating the real symbol vector candidates using equations $$S_r = \left\{ \Re\{s\} = [\Re\{s_0\}\Re\{s_1\}]^T \mid \Re\{s_0\} \in \{\pm 1, \pm 3\}, \right.$$

$$\left. \Re\{s_1\} = Q\left( \frac{(\Re\{z_0\} - 4\Re\{z_1\}) - 4\Re\{s_0\}(|h_0|^2 - |h_1|^2)}{|h_0|^2 + 16|h_1|^2} \right) \right\},$$

$$S'_r = \left\{ \Re\{s\} = [\Re\{s_0\}\Re\{s_1\}]^T \mid \Re\{s_1\} \in \{\pm 1, \pm 3\}, \right.$$

$$\left. \Re\{s_0\} = Q\left( \frac{(\Re\{z_0\} - 4\Re\{z_1\}) - 4\Re\{s_{ML,1}\}(|h_0|^2 - |h_1|^2)}{|h_0|^2 + 16|h_1|^2} \right) \right\},$$

and $\tilde{S}_r = S_r \cup S'_r$; and generating the imaginary symbol vector candidates using equations $$S_i = \left\{ \Im\{s\} = [\Im\{s_0\}\Im\{s_1\}]^T \mid \Im\{s_0\} \in \{\pm 1, \pm 3\}, \right.$$

$$\left. \Im\{s_1\} = Q\left( \frac{(\Im\{z_0\} - 4\Im\{z_1\}) - 4\Im\{s_0\}(|h_0|^2 - |h_1|^2)}{|h_0|^2 + 16|h_1|^2} \right) \right\},$$

$$S'_i = \left\{ \Im\{s\} = [\Im\{s_0\}\Im\{s_1\}]^T \mid \Im\{s_1\} \in \{\pm 1, \pm 3\}, \right.$$

$$\left. \Im\{s_0\} = Q\left( \frac{(\Im\{z_0\} - 4\Im\{z_1\}) - 4\Im\{s_{ML,1}\}(|h_0|^2 - |h_1|^2)}{|h_0|^2 + 16|h_1|^2} \right) \right\},$$

$\tilde{S}_i = S_i \cup S'_i$, where $\tilde{S}_r$ is a set of the real symbol vector candidates, $\tilde{S}_i$ is a set of the imaginary symbol vector candidates, $R\{s_0\}$ is a first sub real symbol vector candidate, $R\{s_1\}$ is a second sub real symbol vector candidate, $R\{z_0\}$ and $R\{z_1\}$ are real values of elements of $$\begin{bmatrix} z_0 & 0 \\ 0 & z_1 \end{bmatrix} = H^H \cdot y,$$

$h_0$ is a channel constant of a first subcarrier, $h_1$ is a channel constant of a second subcarrier, $Q(\ )$ is a slicing function, $I\{s_0\}$ is a first sub imaginary symbol vector candidate, $I\{s_1\}$ is a second sub imaginary symbol vector candidate, $I\{z_0\}$ and $I\{z_1\}$ are imaginary values of the elements of $$\begin{bmatrix} z_0 & 0 \\ 0 & z_1 \end{bmatrix} = H^H \cdot y.$$

The step (d) may include calculating the LLRs using $$LLR(b_k) = \min_{s \in S_r \cap B_k^-} \frac{\tilde{D}_r(s)}{2\sigma_n^2} - \min_{s \in S_r \cap B_k^+} \frac{\tilde{D}_r(s)}{2\sigma_n^2}$$

for k=0, 1, 4, 5 and $$LLR(b_k) = \min_{s \in S_i \cap B_k^-} \frac{\tilde{D}_i(s)}{2\sigma_n^2} - \min_{s \in S_i \cap B_k^+} \frac{\tilde{D}_i(s)}{2\sigma_n^2}$$

for k=2, 3, 6, 7, where $B_k^+$ is a set of symbol vector candidates having 1 as a k-th bit, $B_k^-$ is a set of symbol vector candidates having 0 as the k-th bit, $\tilde{D}_r(s) = \Re\{s\}^T D^T(A\Re\{s\} - 2\Re\{z\})$, $\tilde{D}_i(s) = \Im\{s\}^T D^T(A\Im\{s\} - 2\Im\{z\})$, $\sigma_n$ is a standard deviation of additive white Gaussian noise (AWGN), D is a precoding matrix, $A = H^H HD$, $z = H^H y$, and y is an MDCM reception symbol vector.

The MDCM signal pair may have been modulated using 16-QAM, 256-QAM, or 256×256-QAM.

The method may be used in an MB-OFDM UWB system.

The method may be used in a USB module.

A receiver configured for demodulating a modified dual carrier modulation (MDCM) signal may comprise: a soft decision MDCM demodulator as described above for demodulating the modified dual carrier modulation (MDCM) signal using a soft decision method; a hard decision MDCM demodulator as described above for demodulating the modified dual carrier modulation (MDCM) signal using a hard decision method. And the receiver may be adapted for a selection between soft decision demodulation and hard decision demodulation.

The present inventive concept now will be described more fully hereinafter with reference to the accompanying drawings, in which exemplary embodiments of the inventive concept are shown. The inventive concept may, however, be embodied in many different forms and should not be construed as limited to the exemplary embodiments set forth herein. Rather, these exemplary embodiments are provided so that this disclosure will be sufficient to convey the inventive concept to those skilled in the art. In the drawings, the size and relative sizes of layers and regions may be exaggerated for clarity. Like numbers refer to like or similar elements throughout the specification and the drawings.

It will be understood that when an element is referred to as being "connected" or "coupled" to another element, it can be directly connected or coupled to the other element or intervening elements may be present. As used herein, the singular forms "a", "an" and "the" are intended to include the plural forms as well, unless the context clearly indicates otherwise.

BRIEF DESCRIPTION OF THE DRAWINGS

Features of the present inventive concept will become more apparent by the following detailed description of exemplary embodiments with reference to the attached drawings in which.

DETAILED DESCRIPTION OF EXEMPLARY
EMBODIMENTS OF THE INVENTION

Figure 1:
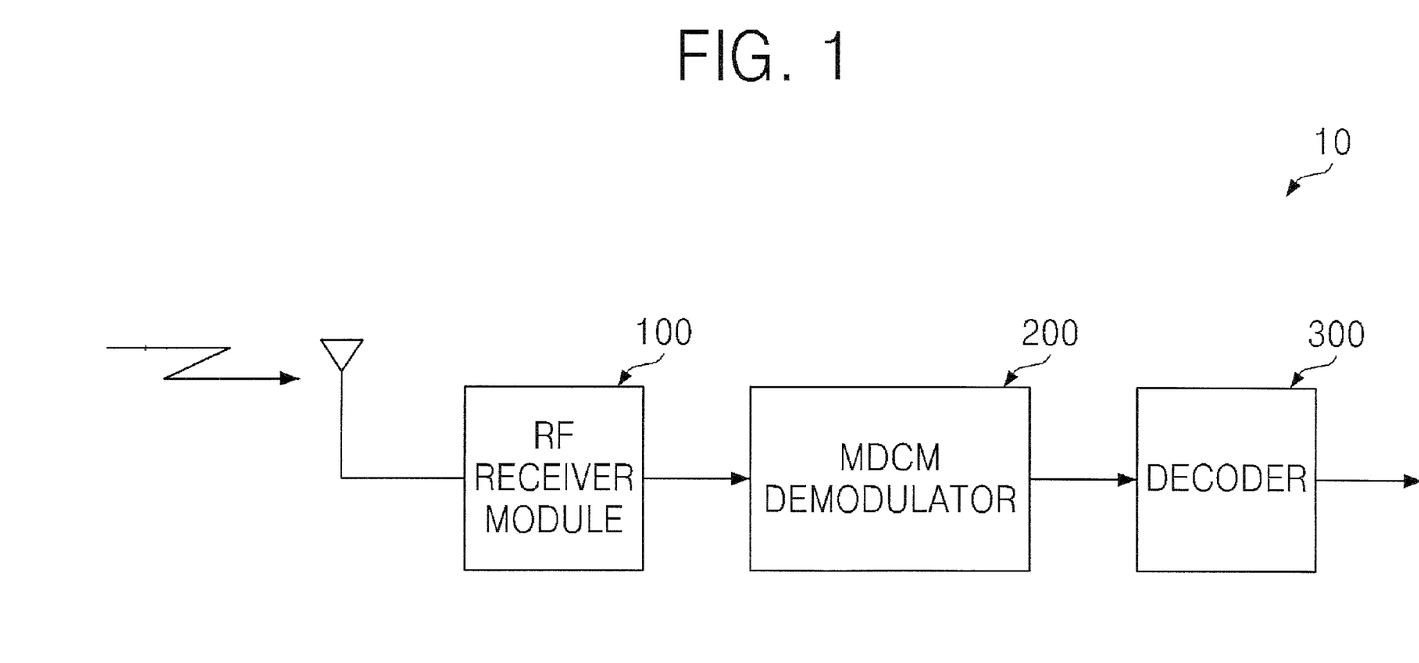
FIG. 1 is a block diagram of a modified dual carrier modulation (MDCM) receiver according to some embodiments of the inventive concept.

FIG. 1 is a block diagram of a modified dual carrier modulation (MDCM) receiver 10 according to some embodiments of the inventive concept. The MDCM receiver 10 includes a radio frequency (RF) receiver module 100, an MDCM demodulator 200, and a decoder 300.

The RF receiver module 100 receives a pair of MDCM signals transmitted over different subcarriers, respectively, from an MDCM transmitter (not shown).

The MDCM transmitter encodes transmission data using forward error correction (FEC) channel coding, maps the encoded transmission data to quadrature amplitude modulation (QAM) symbols, converts QAM symbols into MDCM transmission symbols using precoding to generate the pair of MDCM signals, and transmits the MDCM signals over the different subcarriers, respectively.

The FEC channel coding may be low density parity check (LDPC) channel coding or Viterbi coding. An MDCM modulator (not shown) included in the MDCM transmitter may allocate each group of 8 bits among LDPC channel coded bits, as is defined in standards for a multiband-orthogonal frequency division multiplexing (MB-OFDM) physical layer.

The MDCM modulator divides 8 bits, e.g., b0, b1, b2, b3, b4, b5, b6 and b7, in a single group into a set of four upper bits b0 through b3 and a set of four lower bits b4 through b7 and maps the upper bits and the lower bits to 16-QAM symbols.

According to the standards for the MB-OFDM physical layer, four bits, i.e., input bits are mapped as shown in Table 1.

TABLE 1

| Input bits | I-out | Q-out |
|---|---|---|
| 0000 | −3 | −3 |
| 0001 | −3 | −1 |
| 0010 | −3 | 3 |
| 0011 | −3 | 1 |
| 0100 | −1 | −3 |
| 0101 | −1 | −1 |
| 0110 | −1 | 3 |
| 0111 | −1 | 1 |
| 1000 | 3 | −3 |
| 1001 | 3 | −1 |

TABLE 1-continued

| Input bits | I-out | Q-out |
|---|---|---|
| 1010 | 3 | 3 |
| 1011 | 3 | 1 |
| 1100 | 1 | −3 |
| 1101 | 1 | −1 |
| 1110 | 1 | 3 |
| 1111 | 1 | 1 |

Here, "I-out" indicates the real value of an 16-QAM symbol and "Q-out" indicates the imaginary value thereof. The MDCM modulator converts 16-QAM transmission symbols into two 256-QAM symbols using Equation 1:

$$\begin{bmatrix} x_0 \\ x_1 \end{bmatrix} = D \begin{bmatrix} s_0 \\ s_1 \end{bmatrix}, \quad (1)$$

where $s_0$ and $s_1$ are 16-QAM transmission symbols, $x_0$ and $x_1$ are 256-QAM transmission symbols, and D is a precoding matrix.

According to the standards for the MB-OFDM physical layer, the precoding matrix D may be $$\begin{bmatrix} 4 & 1 \\ 1 & -4 \end{bmatrix}.$$

Depending on the channel state of the subcarriers and the influence of noise, a pair of MDCM signals received by the RF receiver module 100 may be defined as Equation 2:

$$\begin{bmatrix} y_0 \\ y_1 \end{bmatrix} = \begin{bmatrix} h_0 & 0 \\ 0 & h_1 \end{bmatrix} \begin{bmatrix} x_0 \\ x_1 \end{bmatrix} + \begin{bmatrix} n_0 \\ n_1 \end{bmatrix}, \quad (2)$$

where $y_0$ and $y_1$ are MDCM reception symbols, $h_0$ and $h_1$ are respectively channel constants of the respective subcarriers, $x_0$ and $x_1$ are MDCM transmission symbols, and $n_0$ and $n_1$ are additive white Gaussian noises (AWGNs).

The MDCM demodulator 200 demodulates the MDCM reception symbols received from the RF receiver module 100.

The MDCM demodulator 200 may extract the MDCM transmission symbols from the MDCM reception symbols, perform demapping of the extracted MDCM transmission symbols and then outputs reception data, according to a method of demodulating an MDCM signal using hard decision.

When the MDCM signals in the pair may be FEC encoded signals, the reception data output from the MDCM demodulator 200 may have been FEC encoded. In that case, the decoder 300 may perform FEC decoding on the reception data.

Alternatively, the MDCM demodulator 200 may calculate and output a log likelihood ratio (LLR) for each bit in the pair of MDCM signals from the MDCM reception symbols according to a method of demodulating an MDCM signal using soft decision.

The methods of demodulating MDCM reception symbols using the MDCM demodulator 200 will be described in detail with reference to FIGS. 2 and 4 below.

The decoder 300 performs FEC decoding on the reception data or the LLR received from the MDCM demodulator 200. When the MDCM demodulator 200 outputs the reception data as a result of the MDCM signal demodulation method using hard decision, the decoder 300 may perform the FEC decoding on the reception data. When the MDCM demodulator 200 outputs the LLR as a result of the MDCM signal demodulation method using soft decision, the decoder may output FEC-decoded reception data based on the LLR.

Figure 2:
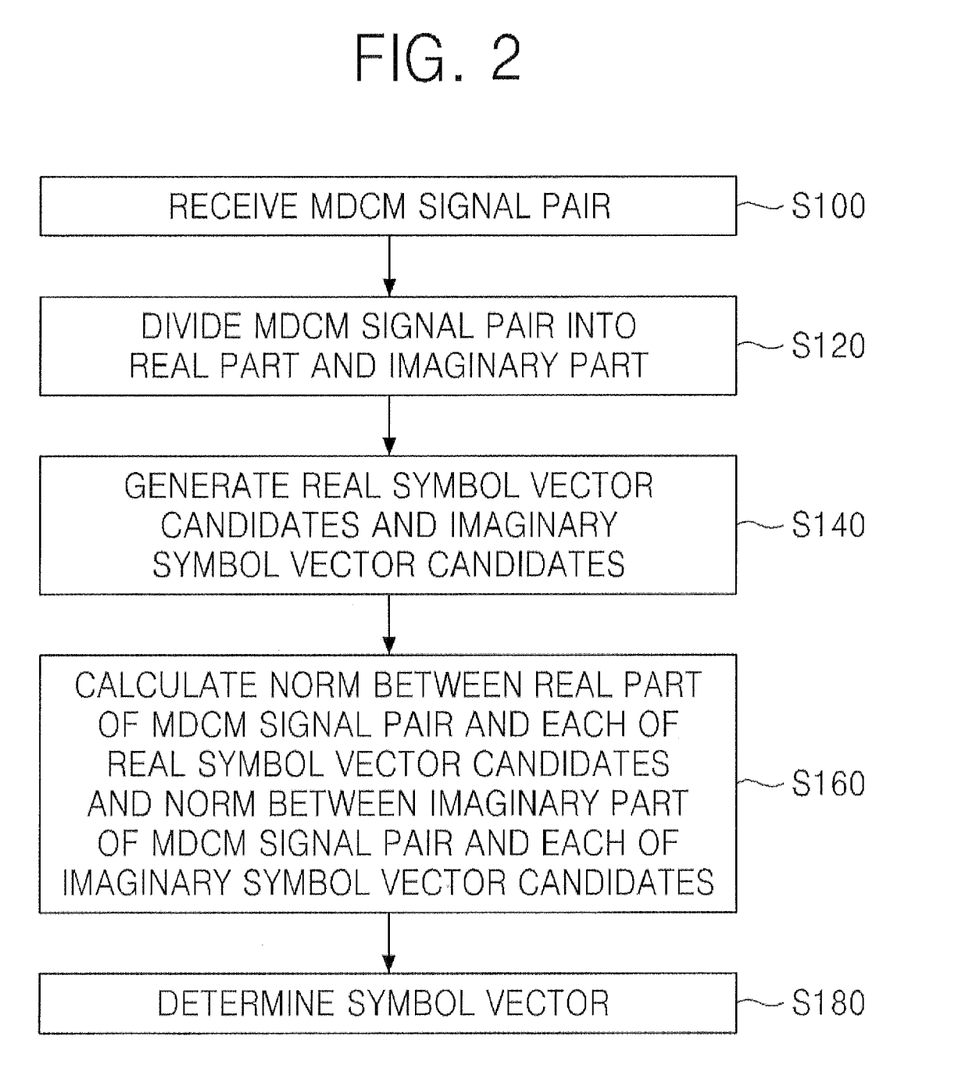
FIG. 2 is a flowchart of a method of demodulating a received MDCM signal using hard decision according to some embodiments of the inventive concept.

FIG. 2 is a flowchart of a method of demodulating a received MDCM signal using hard decision according to some embodiments of the inventive concept. The method according to the current embodiments of the inventive concept will be compared with conventional maximum likelihood (ML) demodulation using hard decision.

In the conventional ML demodulation using hard decision, MDCM reception symbols are demodulated using Equation 3:

$$s_{ML} = \underset{s \in O_{16}^2}{\mathrm{argmin}} \|y - HDs\|^2, \quad (3)$$

where $s_{ML}$ is a transmission symbol vector resulting from the ML demodulation, $O_{16}^2$ is the two-dimensional set of a 16-QAM constellation set $O_{16}$, H is a 2*2 matrix including 0, $h_0$ and $h_1$ shown in Equation 2, s is an element of the set $O_{16}^2$ and y is a 2*1 matrix including $y_0$ and $y_1$ shown in Equation 2.

In other words, in the conventional ML demodulation, all constellation points of a 256-QAM symbol are symbol vector candidates, a norm is calculated for each of the symbol vector candidates, a symbol vector candidate that has the least norm (i.e., the minimum norm) among the symbol vector candidates is determined (selected) as the symbol vector, and the selected symbol vector is demapped as reception data. Accordingly, the conventional ML demodulation requires a norm calculation to be performed 256 times to demodulate each pair of 256-QAM transmission signals.

Referring to FIG. 2, the MDCM demodulator 200, which performs the MDCM signal demodulation using hard decision in the embodiments of the inventive concept, receives an MDCM signal pair in step S100, divides the MDCM signal pair into a real part and an imaginary part in step S120, generates real symbol vector candidates and imaginary symbol vector candidates in step S140, calculate a norm between the real part of the MDCM signal pair and each of the real symbol vector candidates and a norm between the imaginary part of the MDCM signal pair and each of the imaginary symbol vector candidates in step S160, and determines (selects) in step S180 a symbol vector according to the results of the calculations.

In other words, the method of demodulating an MDCM signal using hard decision according to the current embodiments of the inventive concept includes generating real symbol vector candidates and imaginary symbol vector candidates, which correspond to an MDCM signal pair; calculating a norm between the real party of the MDCM signal pair and each of the real symbol vector candidates and determining (selecting) the real symbol vector candidate having the minimum first norm among the real symbol vector candidates as a real symbol vector; and calculating a norm between the imaginary party of the MDCM signal pair and each of the imaginary symbol vector candidates and determining (selecting) the imaginary symbol vector candidate having the minimum second norm among the imaginary symbol vector candidates as an imaginary symbol vector.

In the current embodiments, the MDCM signal pair is divided into the real part and the imaginary part when it is demodulated, and therefore, the number of norm calculations is reduced. Consequently, the computational complexity of demodulation is reduced. When generating the real symbol vector candidates and the imaginary symbol vector candidates: a real value of each of constellation point to which the MDCM signal pair can be mapped may be generated as a real symbol vector candidate; and an imaginary value of each of the constellation points may be generated as an imaginary symbol vector candidate.

The MDCM signal demodulation method using hard decision is described using the following equations (4), (5) (6) and (7):

Equation 3 can be rewritten as Equation 4:

$$s_{ML} = \underset{s \in O_{16}^2}{\operatorname{argmin}} \|(H^H H)^{-1/2}(H^H y - H^H H D s)\|^2, \quad (4)$$

where $H^H$ is a conjugate transpose matrix of a constant channel matrix.

When $z=H^H y$ and $A=H^H HD$, Equation 4 can be rewritten as Equation 5:

$$s_{ML} = \underset{s \in O_{16}^2}{\operatorname{argmin}} \|(H^H H)^{-1/2}(z - As)\|^2. \quad (5)$$

Here, since the constant channel matrix is diagonal matrix, A has a real value. When Equation 5 is divided into a real part and an imaginary part, it can be rewritten as Equation 6:

$$s_{ML} = \underset{\Re\{s\} \in S_R}{\operatorname{argmin}}(\|(H^H H)^{-1/2}(\Re\{z\} - A\Re\{s\})\|^2) + \quad (6)$$

$$j \cdot \underset{\Im\{s\} \in S_I}{\operatorname{argmin}}(\|(H^H H)^{-1/2}(\Im\{z\} - A\Im\{s\})\|^2),$$

where $S_R$ is a set of real values of symbol vector candidates, $S_I$ is a set of imaginary values of the symbol vector candidates, $R\{z\}$ and $R\{s\}$ are respectively real values of "z" and "s", and $I\{z\}$ and $I\{s\}$ are respectively imaginary values of "z" and "s".

For instance, when each MDCM signal in the MDCM signal pair is a 16-QAM signal as is defined in the standards for the MB-OFDM physical layer, $S_R$ and $S_I$ are defined as Equation 7:

$$S_R = \{\Re\{s\} = [\Re\{s_0\} \Re\{s_1\}]^T | \Re\{s_i\} \in \{\pm 1, \pm 3\},$$
$$i=0,1\}$$

$$S_I = \{\Im\{s\} = [\Im\{s_0\} \Im\{s_1\}]^T | \Im\{s_i\} \in \{\pm 1, \pm 3\}, i=0,1\}, \quad (7)$$

where "i" is an index of an MDCM transmission signal, $R\{s_0\}$ is a first sub real symbol vector candidate, $R\{s_1\}$ is a second sub real symbol vector candidate, $I\{s_0\}$ is a first sub imaginary symbol vector candidate, and $I\{s_1\}$ is a second sub imaginary symbol vector candidate.

Referring to Equations 6 and 7, the number of norm calculations performed in the MDCM signal demodulation method using hard decision according to the current embodiments is 16, considering the number of real symbol vector candidates and the number of imaginary symbol vector candidates, when each MDCM signal in the MDCM signal pair is a 16-QAM signal as is defined in the standards for the MB-OFDM physical layer. In other words, the demodulation method in which the MDCM signal pair is divided into a real part and an imaginary part during demodulation reduces multiplication operations by 50% as compared to conventional ML demodulation methods.

Alternatively, when generating the real symbol vector candidates and the imaginary symbol vector candidates: a second sub real symbol vector candidate having the minimum first norm, among the second sub real symbol vector candidates corresponding to a second one of the MDCM signals in the pair, is calculated with respect to each of the first sub real symbol vector candidates corresponding to a first one of the MDCM signals; and the real symbol vector candidates are generated based on a result of this calculation. In addition, when generating the real symbol vector candidates and the imaginary symbol vector candidates: a second sub imaginary symbol vector candidate having the minimum second norm, among the second sub imaginary symbol vector candidates corresponding to the second MDCM signal in the pair, is calculated with respect to each of the second sub imaginary symbol vector candidates corresponding to the first MDCM signal in the pair; and the imaginary symbol vector candidates are generated based on a result of this calculation.

In other words, the MDCM signal demodulation method using hard decision according to the current embodiments reduces the numbers of real vector candidates and imaginary vector candidates, thereby reducing the complexity of the MDCM demodulator 200.

A method to reduce the numbers of real vector candidates and imaginary vector candidates will be described using the following equations (8), (9), (10), and (11).

When a real symbol vector candidate is defined by a first sub real symbol vector candidate corresponding to the first MDCM signal in a pair and a second sub real symbol vector candidate corresponding to the second MDCM signal in the pair, it can be defined as Equation 8:

$$\Re\{s\} = [\Re\{s_0\} \Re\{s_1\}]^T \quad (8)$$

When $R\{s_0\}$ is fixed in Equation 8, $R\{s_1\}$ can be calculated using Equation 9:

$$\underset{\Re\{s_i\} \in \{\pm 1, \pm 3\}}{\operatorname{argmin}} \|(H^H H)^{-1/2}(\Re\{z\} - A_0 \Re\{s_0\} - A_1 \Re\{s_1\})\|^2, \quad (9)$$

where $A_0$ is the first column vector of A and $A_1$ is the second column vector of A.

When there are no noise components in the MDCM signal pair, the result of Equation 9 is $R\{s_1\}$ that makes the solution of a formula in a norm calculation "0".

When the formula in the norm calculation is organized and a slicing function is used, Equation 9 can be rewritten as Equation 10:

$$\Re\{s_1\} = Q\left(\frac{(\Re\{z_0\} - 4\Re\{z_1\}) - 4\Re\{s_0\}(|h_0|^2 - |h_1|^2)}{|h_0|^2 + 16|h_1|^2}\right), \quad (10)$$

where Q( ) is the slicing function which selects as a value of $R\{s_1\}$ a value closest to a value within the slicing function among values that $R\{s_1\}$ can have.

Referring to Equation 10, real symbol vector candidates can be defined as Equation 11:

$$S_r = \left\{\Re\{s\} = [\Re\{s_0\}\Re\{s_1\}]^T \mid \Re\{s_0\} \in \{\pm 1, \pm 3\},\right. \quad (11)$$

$$\left.\Re\{s_1\} = Q\left(\frac{(\Re\{z_0\} - 4\Re\{z_1\}) - 4\Re\{s_0\}(|h_0|^2 - |h_1|^2)}{|h_0|^2 + 16|h_1|^2}\right)\right\},$$

where $S_r$ is a set of real symbol vector candidates.

In Equation 11, there are four real symbol vector candidates corresponding to the elements of the set $S_r$.

The number of imaginary symbol vector candidates can be reduced in the same manner as the number of real symbol vector candidates is reduced. Thus, a redundant detailed description thereof will be omitted. By the same manner of reduction, the imaginary symbol vector candidates can be defined as Equation 12:

$$S_i = \left\{\Im\{s\} = [\Im\{s_0\}\Im\{s_1\}]^T \mid \Im\{s_0\} \in \{\pm 1, \pm 3\},\right. \quad (12)$$

$$\left.\Im\{s_1\} = Q\left(\frac{(\Im\{z_0\} - 4\Im\{z_1\}) - 4\Im\{s_0\}(|h_0|^2 - |h_1|^2)}{|h_0|^2 + 16|h_1|^2}\right)\right\}$$

Referring to Equations 11 and 12, a scheme of obtaining a real symbol vector and an imaginary symbol vector is expressed by Equation 13:

$$s_{ML} = \operatorname*{argmin}_{\Re\{s\} \in S_R}\left(\left\|(H^H H)^{-1/2}(\Re\{z\} - A\Re\{s\})\right\|^2\right) + \quad (13)$$

$$j \cdot \operatorname*{argmin}_{\Im\{s\} \in S_I}\left(\left\|(H^H H)^{-1/2}(\Im\{z\} - A\Im\{s\})\right\|^2\right).$$

Since each of the sets $S_r$ and $S_i$ has four elements in Equation 13, a norm calculation is performed eight times.

The formula in the norm calculation in Equation 13 can be rewritten as Equation 14:

$$s_{ML} = \operatorname*{argmin}_{\Re\{s\} \in S_R}\left(\left\|(H^H H)^{-1/2}\Re\{z\}\right\|^2 + \Re\{s\}^T D^T(A\Re\{s\} - 2\Re\{z\})\right) + \quad (14)$$

$$j \cdot \operatorname*{argmin}_{\Im\{s\} \in S_I}\left(\left\|(H^H H)^{-1/2}\Im\{z\}\right\|^2 + \Im\{s\}^T D^T(A\Im\{s\} - 2\Im\{z\})\right).$$

Since $\|(H^H H)^{-1/2}\Re\{z\}\|^2$ and $\|(H^H H)^{-1/2}\Im\{z\}\|^2$ do not influence the calculation of the "arg min" function, Equation 14 can be simplified to Equation 15:

$$s_{ML} = \operatorname*{argmin}_{\Re\{s\} \in S_r} D_r(s) + j \cdot \operatorname*{argmin}_{\Im\{s\} \in S_i} D_i(s), \quad (15)$$

Here, $D_r(s)$ and $D_i(s)$ are respectively defined as Equations 16 and 17:

$$D_r(s) = \Re\{s\}^T D^T(A\Re\{s\} - 2\Re\{z\}), \quad (16)$$

$$D_i(s) = \Im\{s\}^T D^T(A\Im\{s\} - 2\Im\{z\}), \quad (17)$$

Referring to Equations 15 through 17, the MDCM demodulator 200 performing the MDCM signal demodulation method using hard decision according to the exemplary embodiments of the inventive concept can be implemented using only adders without multipliers. Accordingly, the MDCM signal demodulation method using hard decision according to the embodiments of the inventive concept can reduce the number of norm calculations and the complexity of the norm calculations as well.

Figure 3:
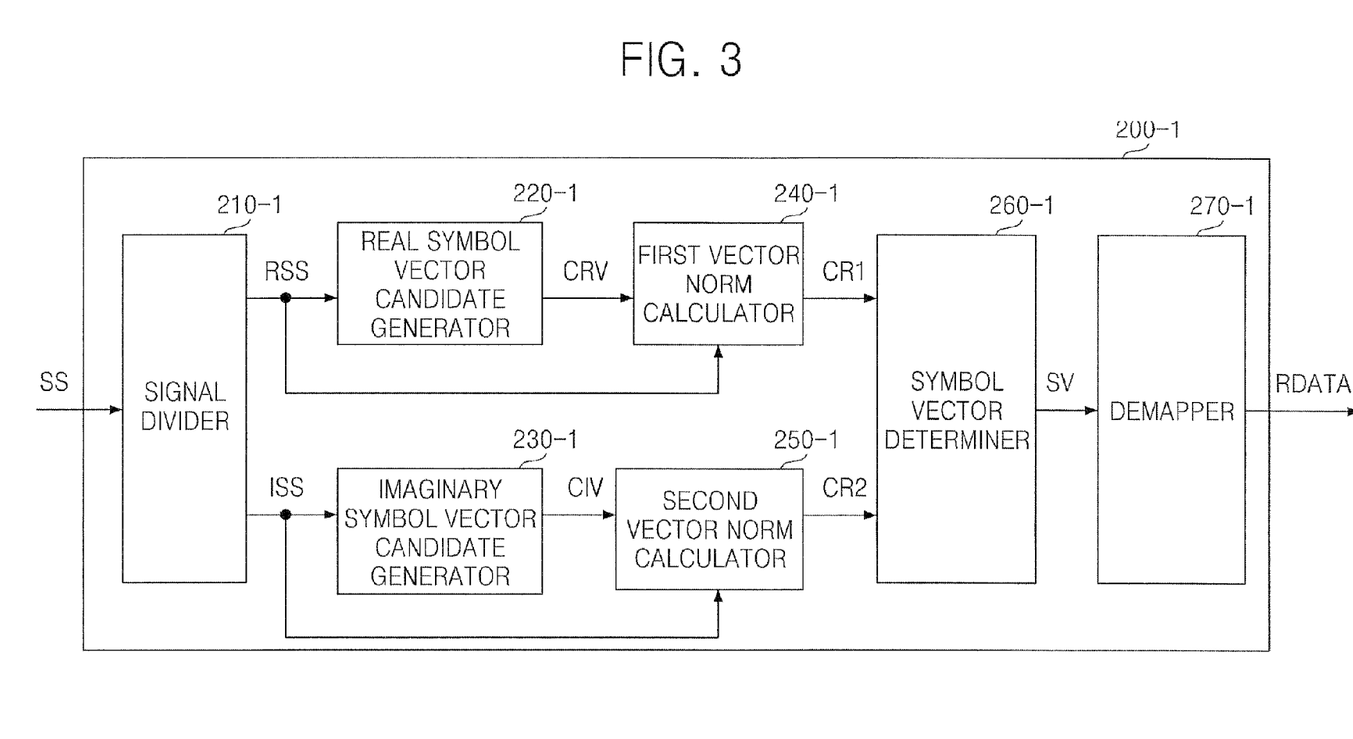
FIG. 3 is a schematic block diagram of an MDCM hard-decision demodulator, as an exemplary implementation of the MDCM demodulator illustrated shown in FIG. 1, according to some embodiments of the inventive concept.

FIG. 3 is a schematic block diagram of an MDCM hard-decision demodulator 200-1, which is an exemplary implementation of the MDCM demodulator 200 shown in FIG. 1, according to some embodiments of the inventive concept. Referring to FIG. 3, the MDCM hard-decision demodulator 200-1 includes a signal divider 210-1, a real symbol vector candidate generator 220-1, an imaginary symbol vector candidate generator 230-1, a first vector norm calculator 240-1, a second vector norm calculator 250-1, and a symbol vector determiner 260-1.

The signal divider 210-1 receives an MDCM signal pair SS from the RF receiver module 100, divides the MDCM signal pair SS into a real part RSS and an imaginary part ISS, and outputs the real part RSS and the imaginary part ISS separately.

The real symbol vector candidate generator 220-1 receives the real part RSS, generates real symbol vector candidates CRV from the real part RSS, and outputs the real symbol vector candidates CRV to the first vector norm calculator 240-1.

The real symbol vector candidates CRV may be respectively real values of respective constellation points to which the MDCM signal pair SS can be mapped. Alternatively, the real symbol vector candidates CRV may be generated using Equation 11.

The imaginary symbol vector candidate generator 230-1 receives the imaginary part ISS, generates imaginary symbol vector candidates CIV from the imaginary part ISS, and outputs the imaginary symbol vector candidates CIV to the second vector norm calculator 250-1.

The imaginary symbol vector candidates CIV may be respectively imaginary values of the respective constellation points to which the MDCM signal pair SS can be mapped. Alternatively, the imaginary symbol vector candidates CIV may be generated using Equation 12.

The first vector norm calculator 240-1 receives the real symbol vector candidates CRV from the real symbol vector candidate generator 220-1 and the real part RSS from the signal divider 210-1, calculates a first norm CR1 between each of the real symbol vector candidates CRV and the real part RSS, and outputs first norms CR1 to the symbol vector determiner 260-1. The first vector norm calculator 240-1 may calculate the first norms CR1 using Equation 15.

The second vector noun calculator 250-1 receives the imaginary symbol vector candidates CIV from the imaginary symbol vector candidate generator 230-1 and the imaginary part ISS from the signal divider 210-1, calculates a second norm CR2 between each of the imaginary symbol vector candidates CIV and the imaginary part ISS, and outputs second norms CR2 to the symbol vector determiner 260-1. The second vector norm calculator 250-1 may calculate the second norms CR2 using Equation 15.

The symbol vector determiner 260-1 receives the first norms CR1 from the first vector norm calculator 240-1 and the second norms CR2 from the second vector norm calculator 250-1, determines a real symbol vector candidate having the minimum norm among the first norms CR1 as a real symbol vector. And, the symbol vector determiner 260-1 determines an imaginary symbol vector candidate having the minimum norm among the second norms CR2 as an imaginary symbol vector, and outputs a symbol vector SV including the real symbol vector and the imaginary symbol vector.

The MDCM hard-decision demodulator 200-1 also includes a demapper 270-1. The demapper 270-1 receives the symbol vector SV from the symbol vector determiner 260-1 and demaps the symbol vector SV to output reception data RDATA.

Figure 4:
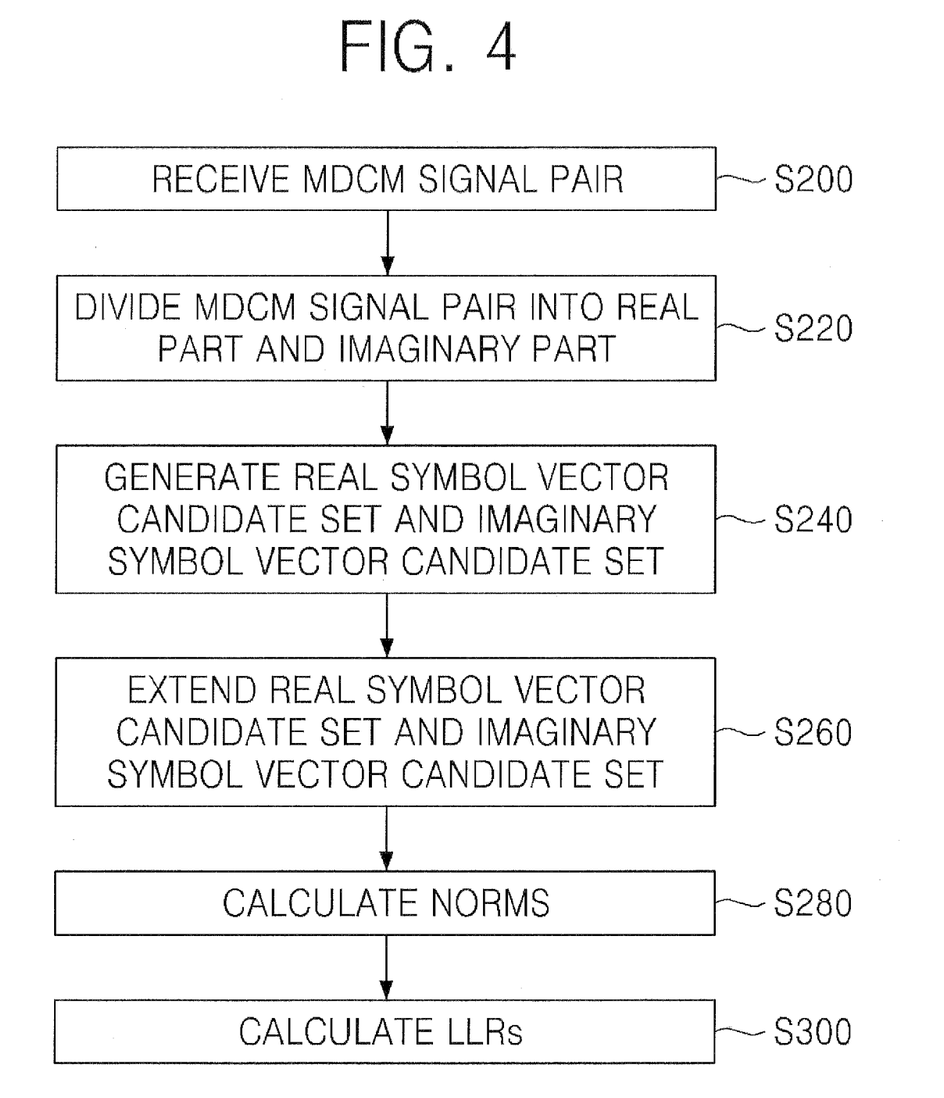
FIG. 4 is a flowchart of a method of demodulating a received MDCM signal using soft decision according to some embodiments of the inventive concept.

FIG. 4 is a flowchart of a method of demodulating an MDCM signal using soft decision according to some embodiments of the inventive concept. The method according to the current embodiments of the inventive concept will be compared with conventional ML demodulation using soft decision. In the conventional ML demodulation using soft decision, an LLR is calculated for each bit in an MDCM transmission signal pair using Equation 18:

$$LLR(b_k) = \ln\left(\frac{Pr[b_k=1|y]}{Pr[b_k=0|y]}\right) = \ln\left(\frac{\sum_{s \in B_k^+} \exp\left(-\frac{\|y - HDs\|^2}{2\sigma_n^2}\right)}{\sum_{s \in B_k^-} \exp\left(-\frac{\|y - HDs\|^2}{2\sigma_n^2}\right)}\right) \quad (18)$$

where $LLR(b_k)$ is an LLR corresponding to the k-th encoded bit $b_k$, $Pr[b_k=1|y]$ is a conditional probability with respect to an MDCM reception symbol vector "y" when $b_k=1$, $Pr[b_k=0|y]$ is a conditional probability with respect to the MDCM reception symbol vector "y" when $b_k=0$, $B_k^+$ is a subset of the set $O_{16}^2$ when $b_k=1$, and $B_k^-$ is a subset of the set $O_{16}^2$ when $b_k=0$.

Equation 18 can be rewritten using max-log approximation as Equation 19:

$$LLR(b_k) = \min_{s \in B_k^-} \frac{\|y - HDs\|^2}{2\sigma_n^2} - \min_{s \in B_k^+} \frac{\|y - HDs\|^2}{2\sigma_n^2}, \quad (19)$$

where $\sigma_n$ is a standard deviation of noise.

Referring to Equation 19, in the conventional ML demodulation using soft decision, 128 norm calculations are performed with respect to each of the subsets $B_k^+$ and $B_k^-$, and therefore, 256 norm calculations are performed in total.

Referring to FIG. 4, the MDCM demodulator 200, which performs the MDCM signal demodulation using soft decision in the embodiments of the inventive concept, receives an MDCM signal pair in step S200, divides the MDCM signal pair into a real part and an imaginary part in step S220, generates a real symbol vector candidate set and an imaginary symbol vector candidate set in step S240, extends the real symbol vector candidate set and the imaginary symbol vector candidate set in step S260, calculates a norm between the real part of the MDCM signal pair and each of real symbol vector candidates in the extended real symbol vector candidate set and calculates a norm between the imaginary part of the MDCM signal pair and each of imaginary symbol vector candidates in the extended imaginary symbol vector candidate set in step S280, and calculates an LLR for each bit in the MDCM signal pair based on the results of the calculations in step S300. As will be understood by persons skilled in the art, various steps and substeps recited above can be performed concurrently (in parallel hardware implementations) to increase the through-put rate of the method.

In other words, the MDCM signal demodulation method using soft decision according to the current embodiments of the inventive concept includes the steps: (a) generating real symbol vector candidates and imaginary symbol vector candidates; (b) calculating a norm between the real party of the MDCM signal pair and each of the real symbol vector candidates and outputting first calculation results; (c) calculating a norm between the imaginary party of the MDCM signal pair and each of the imaginary symbol vector candidates and outputting second calculation results; and (d) calculating LLRs for bits, respectively, in the MDCM signal pair based on the first calculation results and the second calculation results. As will be understood by persons skilled in the art, various steps recited above and substeps thereof recited below can be performed concurrently (in parallel-hardware implementations) to increase the through-put rate of the method.

In the MDCM signal demodulation method using soft decision according to the current embodiments of the inventive concept, which is similar to the MDCM signal demodulation method using hard decision illustrated in FIG. 2, the MDCM signal pair is divided into the real part and the imaginary part and LLRs are calculated for the MDCM signal pair, and therefore, the complexity of demodulation is reduced.

In the step (a), real values of respective constellation points to which the MDCM signal pair can be mapped may be generated as the real symbol vector candidates and imaginary values of the respective constellation points may be generated as the imaginary symbol vector candidates.

Alternatively, the step (a) may include the sub steps: (a1) calculating a second sub real symbol vector candidate having the minimum norm among second sub real symbol vector candidates corresponding to the second MDCM signal in the MDCM signal pair with respect to each of first sub real symbol vector candidates corresponding to the first MDCM signal in the MDCM signal pair and generating real symbol vector candidates based on a result of this calculation; (a2) calculating a first sub real symbol vector candidate having the minimum norm among the first sub real symbol vector candidates with respect to each of the second sub real symbol vector candidates and generating real symbol vector candidates based on a result of this calculation; (a3) calculating a second sub imaginary symbol vector candidate having the minimum norm among second sub imaginary symbol vector candidates corresponding to the second MDCM signal in the MDCM signal pair with respect to each of first sub imaginary symbol vector candidates corresponding to the first MDCM signal in the MDCM signal pair and generating imaginary symbol vector candidates based on a result of this calculation; and (a4) calculating a first sub imaginary symbol vector candidate having the minimum norm among the first sub imaginary symbol vector candidates with respect to each of the second sub imaginary symbol vector candidates and generating imaginary symbol vector candidates based on a result of this calculation.

The substeps (a1) and (a3) correspond to the step S240 in which the real symbol vector candidate set and the imaginary symbol vector candidate set are generated in FIG. 4. The result of the substep (a1) can be expressed by Equation 11 and the result of the substep (a3) can be expressed by Equation 12.

In the MDCM signal demodulation method using soft decision, it is necessary to calculate LLRs based on the norms of all constellation points. However, the norms of all constellation points cannot be calculated from the real symbol vector candidate set generated in the substep (a1) and the imaginary symbol vector candidate set generated in substep (a3). Accordingly, it is necessary to extend the real symbol vector candidate set and the imaginary symbol vector candidate set.

The substep (a2) allows additional real symbol vector candidates to be generated using Equation 20:

$$S'_r = \left\{ \Re\{s\} = [\Re\{s_0\}\Re\{s_1\}]^T \mid \Re\{s_1\} \in \{\pm 1, \pm 3\}, \right. \tag{20}$$

$$\left. \Re\{s_0\} = Q\left(\frac{(\Re\{z_0\} - 4\Re\{z_1\}) - 4\Re\{s_{ML,1}\}(|h_0|^2 - |h_1|^2)}{|h_0|^2 + 16|h_1|^2}\right)\right\}.$$

The extended real symbol vector candidate set is defined as Equation 21:

$$\tilde{S}_r = S_r \cup S'_r. \tag{21}$$

The substep (a4) allows additional imaginary symbol vector candidates to be generated using Equation 22:

$$S'_i = \left\{ \Im\{s\} = [\Im\{s_0\}\Im\{s_1\}]^T \mid \Im\{s_1\} \in \{\pm 1, \pm 3\}, \right. \tag{22}$$

$$\left. \Im\{s_0\} = Q\left(\frac{(\Im\{z_0\} - 4\Im\{z_1\}) - 4\Im\{s_{ML,1}\}(|h_0|^2 - |h_1|^2)}{|h_0|^2 + 16|h_1|^2}\right)\right\}.$$

The extended imaginary symbol vector candidate set is defined as Equation 23:

$$\tilde{S}_i = S_i \cup S'_i. \tag{23}$$

Equation 19 can be rewritten as Equations 24 and 25 in the similar manner to that used in the MDCM hard-decision demodulation method described with reference to FIG. 2 above:

$$LLR(b_k) = \min_{s \in \tilde{S}_r \cap B_k^-} \frac{D_r(s)}{2\sigma_n^2} - \min_{s \in \tilde{S}_r \cap B_k^+} \frac{D_r(s)}{2\sigma_n^2}, \tag{24}$$

where "k" is 0, 1, 4, or 5. Thus, an LLR is calculated for each of only 0th, 1st, 4th and 5th bits based on the first norms; and $$LLR(b_k) = \min_{s \in \tilde{S}_i \cap B_k^-} \frac{D_i(s)}{2\sigma_n^2} - \min_{s \in \tilde{S}_i \cap B_k^+} \frac{D_i(s)}{2\sigma_n^2}, \tag{25}$$

where "k" is 2, 3, 6, or 7. Thus, an LLR is calculated for each of only 2nd, 3rd, 6th and 7th bits based on the second norms.

The reason that a procedure for calculating the LLR is different depending on the value of "k" is that referring to Table 1 the 0th, 1st, 4th and 5th bits influence only the real part of the MDCM signal pair and the 2nd, 3rd, 6th and 7th bits influence only the imaginary part of the MDCM signal pair.

Each of the real symbol vector candidate set defined as Equation 23 and the imaginary symbol vector candidate set defined as Equation 25 has a maximum of eight elements, and therefore, a maximum of 16 norm calculations are performed in the MDCM soft-decision demodulation method. In other words, the number of norm calculations required in the MDCM soft-decision demodulation method is ⅛th of that required in the conventional ML soft-decision demodulation.

Table 2 compares the numbers of real multiplications carried out in MDCM demodulation according to embodiments of the inventive concept with the numbers of real multiplications carried out in conventional ML demodulation.

TABLE 2

| Demodulation Method | The Number of Real Multiplications |
|---|---|
| ML hard decision | 1024 |
| ML soft decision | 1024 |
| Hard decision according to the inventive concept | 18 |
| Soft decision according to the inventive concept | 24 |

Figure 5:
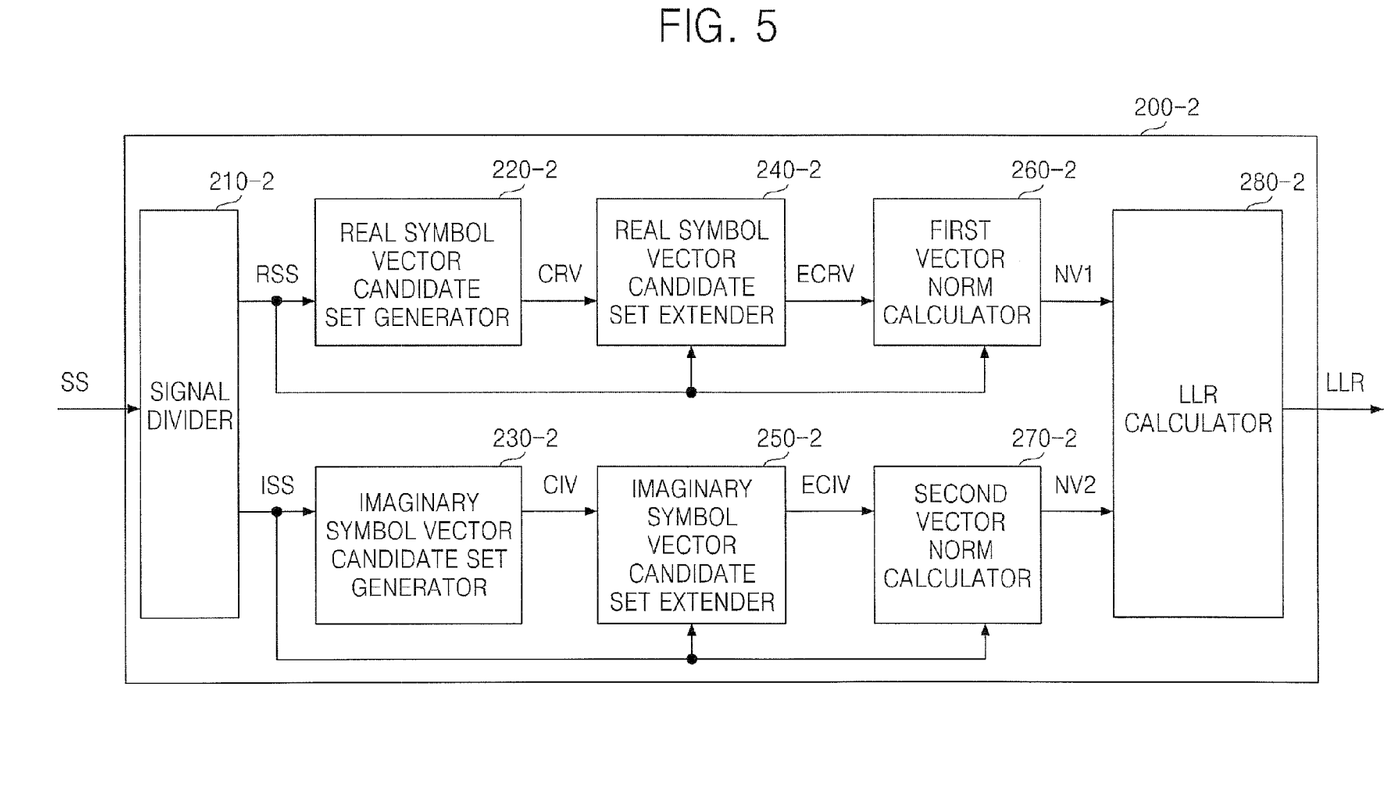
FIG. 5 is a schematic block diagram of an MDCM soft-decision demodulator, as an exemplary implementation of the MDCM demodulator shown in FIG. 1, according to some embodiments of the inventive concept.

FIG. 5 is a schematic block diagram of an MDCM soft-decision demodulator 200-2, which is another exemplary implementation of the MDCM demodulator 200 shown in FIG. 1, according to some embodiments of the inventive concept. Referring to FIG. 5, the MDCM soft-decision demodulator 200-2 includes a signal divider 210-2, a real symbol vector candidate set generator 220-2, an imaginary symbol vector candidate set generator 230-2, a real symbol vector candidate set extender 240-2, an imaginary symbol vector candidate set extender 250-2, a first vector norm calculator 260-2, a second vector norm calculator 270-2, and an LLR calculator 280-2.

The signal divider 210-2 receives an MDCM signal pair SS, divides the MDCM signal pair SS into a real part RSS and an imaginary part ISS, and outputs the real part RSS and the imaginary part ISS separately.

The real symbol vector candidate set generator 220-2 receives the real part RSS from the signal divider 210-2 and generates and outputs a real symbol vector candidate set CRV based on the real part RSS.

The real symbol vector candidate set generator 220-2 may generate the real symbol vector candidate set CRV using Equation 11.

The imaginary symbol vector candidate set generator 230-2 receives the imaginary part ISS from the signal divider 210-2 and generates and outputs an imaginary symbol vector candidate set CIV based on the imaginary part ISS.

The imaginary symbol vector candidate set generator 230-2 may generate the imaginary symbol vector candidate set CIV using Equation 12.

The real symbol vector candidate set extender 240-2 receives the real part RSS from the signal divider 210-2 and the real symbol vector candidate set CRV from the real symbol vector candidate set generator 220-2, extends the real symbol vector candidate set CRV by generating additional real symbol vector candidates based on the real part RSS, and outputs an extended real symbol vector candidate set ECRV.

The real symbol vector candidate set extender 240-2 may generate the extended real symbol vector candidate set ECRV using Equations 22 and 23.

The imaginary symbol vector candidate set extender 250-2 receives the imaginary part ISS from the signal divider 210-2 and the imaginary symbol vector candidate set CIV from the imaginary symbol vector candidate set generator 230-2, extends the imaginary symbol vector candidate set CIV by generating additional imaginary symbol vector candidates based on the imaginary part ISS, and outputs an extended imaginary symbol vector candidate set ECIV.

The imaginary symbol vector candidate set extender 250-2 may generate the extended imaginary symbol vector candidate set ECIV using Equations 24 and 25.

The first vector norm calculator 260-2 receives the extended real symbol vector candidate set ECRV from the real symbol vector candidate set extender 240-2 and the real part RSS from the signal divider 210-2, calculates a first norm NV1 between the real part RSS and each of real symbol vector candidates in the extended real symbol vector candidate set ECRV, and outputs first norms NV1.

The second vector norm calculator 270-2 receives the extended imaginary symbol vector candidate set ECIV from the imaginary symbol vector candidate set extender 250-2 and the imaginary part ISS from the signal divider 210-2, calculates a second norm NV2 between the imaginary part ISS and each of imaginary symbol vector candidates in the extended imaginary symbol vector candidate set ECIV, and outputs second norms NV2.

The LLR calculator 280-2 receives the first norms NV1 from the first vector norm calculator 260-2 and the second norms NV2 from the second vector norm calculator 270-2 and calculates LLRs for bits, respectively, in the MDCM signal pair based on the first norms NV1 and the second norms NV2.

Figure 6:
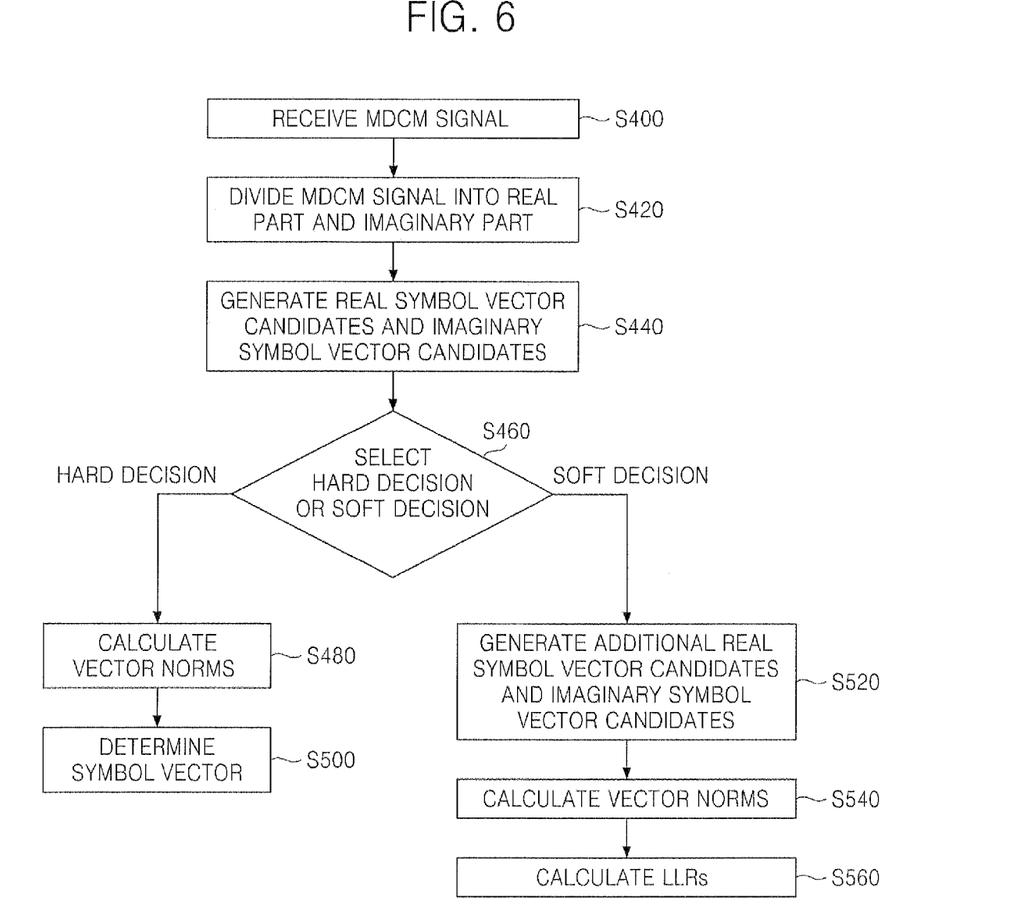
FIG. 6 is a flowchart of a method performed by the MDCM demodulator shown in FIG. 1 that demodulates a received MDCM signal selectively using hard decision or soft decision, according to some embodiments of the inventive concept.

FIG. 6 is a flowchart of a method performed by the MDCM demodulator 200 shown in FIG. 1, which demodulates an MDCM signal selectively using hard decision or soft decision, according to some embodiments of the inventive concept. Referring to FIG. 6, the MDCM demodulator 200 receives an MDCM signal in step S400, divides the MDCM signal into a real part and an imaginary part in step S420, and generates real symbol vector candidates and imaginary symbol vector candidates in step S440.

Either soft decision or hard decision is selected for demodulation according to the setting of the MDCM receiver 10 in step S460.

When the hard decision is selected, the MDCM demodulator 200 calculates a vector norm between the real part of the MDCM signal and each of the real symbol vector candidates and a vector norm between the imaginary part of the MDCM signal and each of the imaginary symbol vector candidates in step S480 and determines a symbol vector according to the results of the calculations in step S500.

When the soft decision is selected, the MDCM demodulator 200 generates additional real symbol vector candidates and additional imaginary symbol vector candidates in step S520, calculates a vector norm between the real part of the MDCM signal and each of the real symbol vector candidates and a vector norm between the imaginary part of the MDCM signal and each of the imaginary symbol vector candidates in step S540, and calculates LLRs based on the results of the calculations in step S560.

Figure 7:
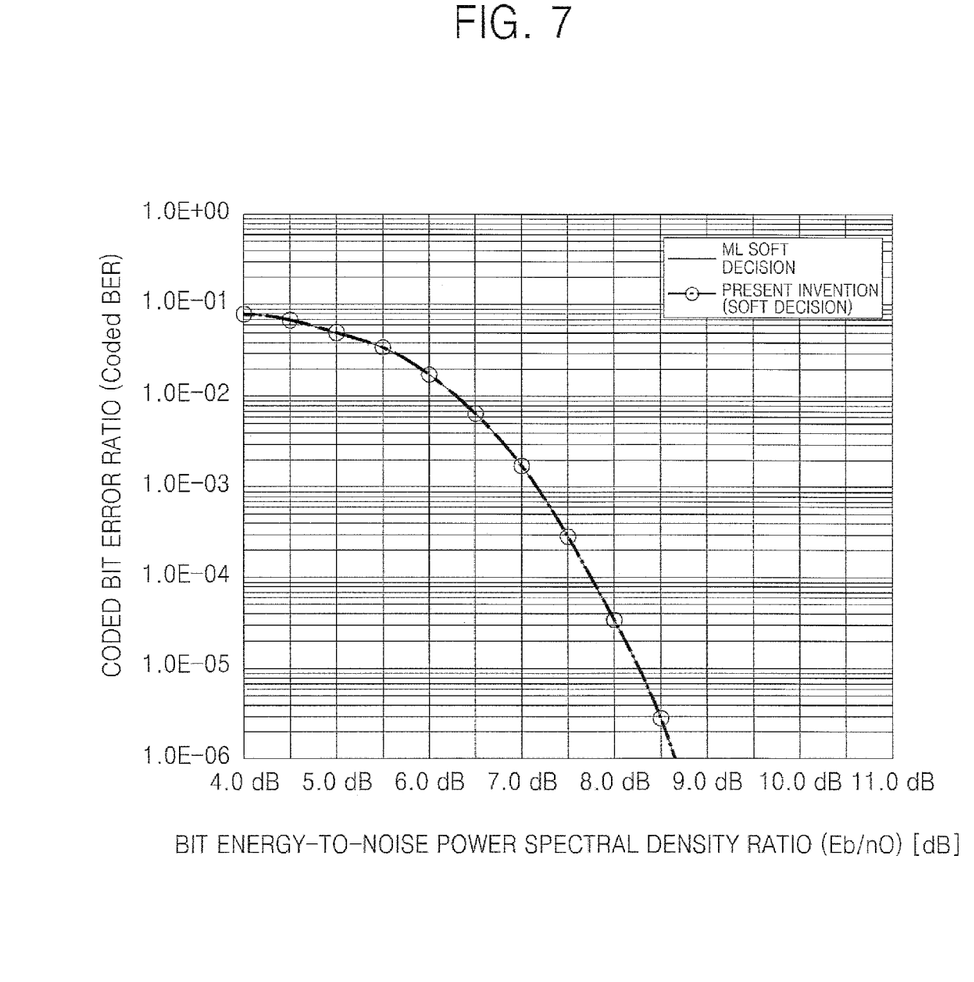
FIG. 7 is a graph showing a comparison between the simulation result of a conventional maximum likelihood (ML) method using soft decision and the simulation result of a MDCM signal demodulation method using soft decision according to some embodiments of the inventive concept.

FIG. 7 is a graph showing the comparison between the simulation result of an ML method using soft decision and the simulation result of MDCM signal demodulation method using soft decision according to some embodiments of the inventive concept. Referring to FIG. 7, the ML soft-decision method and the MDCM signal demodulation method using soft decision according to the inventive concept provide the same performance.

An MDCM signal demodulation method using soft decision and an MDCM signal demodulation method using hard decision according to some embodiments of the inventive concept can be applied to MB-OFDM ultra wideband (UWB) systems and wireless universal serial bus (USB) modules.

For clarity of the description, there have been described methods of demodulating an MDCM transmission signal pair generated by grouping 8 bits into a single group, generating 16-QAM symbols, converting the 16-QAM symbols into 256-QAM symbols according to the standards for the MB-OFDM physical layer proposed by the WiMedia Alliance, Inc. However, when the inventive concept can also be used in demodulating various types of MDCM transmission signals such as binary phase shift keying (BPSK) signals, quadrature phase shift keying (QPSK) signals, 16-QAM signals, 64-QAM signals, 256-QAM signals, and 256×256-QAM signals.

As described above, according to some embodiments of the inventive concept, an MDCM signal is divided into a real part and an imaginary part when it is demodulated, so that the number of symbol vector candidates and the number of multiplications are decreased. As a result, the same performance as provided by conventional ML demodulation can be provided and the complexity of a demodulation system can also be reduced.

While the present inventive concept has been particularly shown and described with reference to exemplary embodiments thereof, it will be understood by those of ordinary skill in the art that various changes in forms and details may be made therein without departing from the spirit and scope of the present inventive concept as defined by the following claims.

What is claimed is:

1. A method of demodulating a modified dual carrier modulation (MDCM) signal using hard decision, the method comprising:
generating real symbol vector candidates that correspond to an MDCM signal pair;
calculating a first norm between a real part of the MDCM signal pair and each of the real symbol vector candidates and selecting from among the real symbol vector candidates a real symbol vector candidate that has the minimum first norm as a real symbol vector;
generating imaginary symbol vector candidates that correspond to the MDCM signal pair; and
calculating a second norm between an imaginary part of the MDCM signal pair and each of the imaginary symbol vector candidates and selecting from among the imaginary symbol vector candidates an imaginary symbol vector candidate that has the minimum second norm as an imaginary symbol vector.

2. The method of claim 1, wherein the generating the real symbol vector candidates comprises determining real values of constellation points to which the MDCM signal pair can be mapped as the real symbol vector candidates,
wherein the generating the imaginary symbol vector candidates comprises determining imaginary values of the constellation points to which the MDCM signal pair can be mapped as the imaginary symbol vector candidates.

3. The method of claim 1, wherein the generating the real symbol vector candidates comprises:
calculating a second sub real symbol vector candidate having the minimum first norm among second sub real symbol vector candidates corresponding to the second MDCM signal in the MDCM signal pair with respect to each of first sub real symbol vector candidates corresponding to the first MDCM signal in the MDCM signal pair and generating the real symbol vector candidates based on a result of this calculation; and
wherein the generating the imaginary symbol vector candidates comprises:
calculating a second sub imaginary symbol vector candidate having the minimum second norm among second sub imaginary symbol vector candidates corresponding to the second MDCM signal with respect to each of first sub imaginary symbol vector candidates corresponding to the first MDCM signal and the imaginary symbol vector candidates based on a result of this calculation.

4. The method of claim 3, wherein the generating the real symbol vector candidates comprises using $$S_r = \left\{ \Re\{s\} = [\Re\{s_0\}\Re\{s_1\}]^T | \Re\{s_0\} \in \{\pm 1, \pm 3\}, \right.$$

$$\left. \Re\{s_1\} = Q\left(\frac{(\Re\{z_0\} - 4\Re\{z_1\}) - 4\Re\{s_0\}(|h_0|^2 - |h_1|^2)}{|h_0|^2 + 16|h_1|^2}\right) \right\}$$

and
wherein the generating the imaginary symbol vector candidates comprises using $$S_i = \left\{ \Im\{s\} = [\Im\{s_0\}\Im\{s_1\}]^T | \Im\{s_0\} \in \{\pm 1, \pm 3\}, \right.$$

$$\left. \Im\{s_1\} = Q\left(\frac{(\Im\{z_0\} - 4\Im\{z_1\}) - 4\Im\{s_0\}(|h_0|^2 - |h_1|^2)}{|h_0|^2 + 16|h_1|^2}\right) \right\},$$

where $R\{s_0\}$ is a first sub real symbol vector candidate, $R\{s_1\}$ is a second sub real symbol vector candidate, $R\{z_0\}$ and $R\{z_1\}$ are real values of elements of $$\begin{bmatrix} z_0 & 0 \\ 0 & z_1 \end{bmatrix} = H^H \cdot y,$$

$h_0$ is a channel constant of a first subcarrier, $h_1$ is a channel constant of a second subcarrier, $Q(\ )$ is a slicing function, $I\{s_0\}$ is a first sub imaginary symbol vector candidate, $I\{s_1\}$ is a second sub imaginary symbol vector candidate, $I\{z_0\}$ and $I\{z_1\}$ are imaginary values of the elements of $$\begin{bmatrix} z_0 & 0 \\ 0 & z_1 \end{bmatrix} = H^H \cdot y.$$

5. The method of claim 4, wherein the real symbol vector is determined using $$\underset{\Re\{s\} \in S_r}{\mathrm{argmin}} (\Re\{s\}^T D^T (A \Re\{s\} - 2\Re\{z\}))$$

and the imaginary symbol vector is determined using $$\underset{\Re\{s\} \in S_i}{\mathrm{argmin}} (\Im\{s\}^T D^T (A \Im\{s\} - 2\Im\{z\})),$$

where $A = H^H H D$ and D is a precoding matrix.

6. The method of claim 1, wherein the MDCM signal pair has been modulated using one selected from the group consisting of 16-quadrature amplitude modulation (QAM), 256-QAM, and 256×256-QAM.

7. A multiband orthogonal frequency division multiplexing (MB-OFDM) ultra wideband (UWB) system using the method of claim 1.

8. A universal serial bus (USB) module adapted to perform the method of demodulating a modified dual carrier modulation (MDCM) signal using hard decision of claim 1.

9. A method of demodulating a modified dual carrier modulation (MDCM) signal using soft decision, the method comprising the following steps:
  (a) generating real symbol vector candidates and imaginary symbol vector candidates;
  (b) calculating a norm between a real part of an MDCM signal pair and each of the real symbol vector candidates and generating first calculation results;
  (c) calculating a norm between an imaginary part of the MDCM signal pair and each of the imaginary symbol vector candidates and generating second calculation results; and
  (d) calculating a log likelihood ratio for each of bits in the MDCM signal pair based on the first calculation results and the second calculation results.

10. The method of claim 9, wherein the step (a) comprises:
generating real values of constellation points to which the MDCM signal pair can be mapped as the real symbol vector candidates, and
generating imaginary values of the constellation points to which the MDCM signal pair can be mapped as the imaginary symbol vector candidates.

11. The method of claim 9, wherein the step (a) comprises:
calculating a second sub real symbol vector candidate having the minimum norm among second sub real symbol vector candidates corresponding to the second MDCM signal in the MDCM signal pair with respect to each of first sub real symbol vector candidates corresponding to the first MDCM signal in the MDCM signal pair and generating real symbol vector candidates based on a result of this calculation;
calculating a first sub real symbol vector candidate having the minimum norm among the first sub real symbol vector candidates with respect to each of the second sub real symbol vector candidates and generating real symbol vector candidates based on a result of this calculation;
calculating a second sub imaginary symbol vector candidate having the minimum norm among second sub imaginary symbol vector candidates corresponding to the second MDCM signal in the MDCM signal pair with respect to each of first sub imaginary symbol vector candidates corresponding to the first MDCM signal in the MDCM signal pair and generating imaginary symbol vector candidates based on a result of this calculation; and
calculating a first sub imaginary symbol vector candidate having the minimum norm among the first sub imaginary symbol vector candidates with respect to each of the second sub imaginary symbol vector candidates and generating imaginary symbol vector candidates based on a result of this calculation.

12. The method of claim 9, wherein the step (a) comprises:
generating the real symbol vector candidates using equations $$S_r = \left\{ \Re\{s\} = [\Re\{s_0\}\Re\{s_1\}]^T | \Re\{s_0\} \in \{\pm 1, \pm 3\}, \right.$$

$$\left. \Re\{s_1\} = Q\left(\frac{(\Re\{z_0\} - 4\Re\{z_1\}) - 4\Re\{s_0\}(|h_0|^2 - |h_1|^2)}{|h_0|^2 + 16|h_1|^2}\right) \right\},$$

$$S'_r = \left\{ \Re\{s\} = [\Re\{s_0\}\Re\{s_1\}]^T | \Re\{s_1\} \in \{\pm 1, \pm 3\}, \right.$$

$$\left. \Re\{s_0\} = Q\left(\frac{(\Re\{z_0\} - 4\Re\{z_1\}) - 4\Re\{s_{ML,1}\}(|h_0|^2 - |h_1|^2)}{|h_0|^2 + 16|h_1|^2}\right) \right\},$$

and $\tilde{S}_r = S_r \cup S'_r$;

and
generating the imaginary symbol vector candidates using equations $$S_i = \left\{ \Im\{s\} = [\Im\{s_0\}\Im\{s_1\}]^T | \Im\{s_0\} \in \{\pm 1, \pm 3\}, \right.$$

$$\Im\{s_1\} = Q\left(\frac{(\Im\{z_0\} - 4\Im\{z_1\}) - 4\Im\{s_0\}(|h_0|^2 - |h_1|^2)}{|h_0|^2 + 16|h_1|^2}\right)\right\},$$

$$S'_i = \left\{ \Im\{s\} = [\Im\{s_0\}\Im\{s_1\}]^T | \Im\{s_1\} \in \{\pm 1, \pm 3\}, \right.$$

$$\Im\{s_0\} = Q\left(\frac{(\Im\{z_0\} - 4\Im\{z_1\}) - 4\Im\{s_{ML,1}\}(|h_0|^2 - |h_1|^2)}{|h_0|^2 + 16|h_1|^2}\right)\right\},$$

and $\tilde{S}_i = S_i \cup S'_i$, where $\tilde{S}_r$ is a set of the real symbol vector candidates, $\tilde{S}_i$ is a set of the imaginary symbol vector candidates, $R\{s_0\}$ is a first sub real symbol vector candidate, $R\{s_1\}$ is a second sub real symbol vector candidate, $R\{z_0\}$ and $R\{z_1\}$ are real values of elements of $$\begin{bmatrix} z_0 & 0 \\ 0 & z_1 \end{bmatrix} = H^H \cdot y,$$

$h_0$ is a channel constant of a first subcarrier, $h_1$ is a channel constant of a second subcarrier, Q( ) is a slicing function, $I\{s_0\}$ is a first sub imaginary symbol vector candidate, $I\{s_1\}$ is a second sub imaginary symbol vector candidate, $I\{z_0\}$ and $I\{z_1\}$ are imaginary values of the elements of $$\begin{bmatrix} z_0 & 0 \\ 0 & z_1 \end{bmatrix} = H^H \cdot y.$$

13. The method of claim 12, wherein the step (d) comprises calculating the nits using $$LLR(b_k) = \min_{s \in \tilde{S}_r \cap B_k^-} \frac{\tilde{D}_r(s)}{2\sigma_n^2} - \min_{s \in \tilde{S}_r \cap B_k^+} \frac{\tilde{D}_r(s)}{2\sigma_n^2},$$

for k=0, 1, 4, 5 and $$LLR(b_k) = \min_{s \in \tilde{S}_r \cap B_k^-} \frac{\tilde{D}_i(s)}{2\sigma_n^2} - \min_{s \in \tilde{S}_i \cap B_k^+} \frac{\tilde{D}_i(s)}{2\sigma_n^2}$$

for k=2, 3, 6, 7, where $B_k^+$ is a set of symbol vector candidates having 1 as a k-th hit, $B_k^-$ is a set of symbol vector candidates having 0 as the k-th bit, $\tilde{D}_r(s) = \Re\{s\}^T D^T(A\Re\{s\} - 2\Re\{z\})$, $\tilde{D}_i(s) = \Im\{s\}^T D^T(A\Im\{s\} - 2\Im\{z\})$, $\sigma_n$ is a standard deviation of additive white Gaussian noise (AWGN), D is a precoding matrix, $A = H^H H D$, $z = H^H y$, and y is an MDCM reception symbol vector.

14. The method of claim 9, wherein the MDCM signal pair has been modulated using one selected from the group consisting of 16-quadrature amplitude modulation (QAM), 256-QAM, and 256×256-QAM.

15. A multiband orthogonal frequency division multiplexing (MB-OFDM) ultra wideband (UWB) system adapted to perform the method of demodulating a modified dual carrier modulation (MDCM) signal using soft decision of claim 9.

16. A universal serial bus (USB) module adapted to perform the method of demodulating a modified dual carrier modulation (MDCM) signal using soft decision of claim 9.

17. A receiver configured for demodulating a modified dual carrier modulation (MDCM) signal, comprising:
a soft decision MDCM demodulator for demodulating the modified dual carrier modulation (MDCM) signal using a soft decision method;
a hard decision MDCM demodulator for demodulating the modified dual carrier modulation (MDCM) signal using a hard decision method;
wherein the receiver is adapted for selection between soft decision demodulation and hard decision demodulation.

18. The receiver of claim 17, wherein when soft decision demodulation is selected, the soft decision MDCM demodulator generates additional real symbol vector candidates and additional imaginary symbol vector candidates, calculates a vector norm between the real part of the MDCM signal and each of the real symbol vector candidates and a vector norm between the imaginary part of the MDCM signal and each of the imaginary symbol vector candidates, and calculates LLRs based on the results of these calculations; and
wherein when hard decision demodulation is selected, the hard-decision MDCM demodulator calculates a vector norm between the real part of the MDCM signal and each of the real symbol vector candidates and a vector norm between the imaginary part of the MDCM signal and each of the imaginary symbol vector candidates and determines a symbol vector according to the results of these calculations.

19. The receiver of claim 17, wherein when soft decision demodulation is selected, soft decision demodulation is performed with the following steps:
(a) generating real symbol vector candidates and imaginary symbol vector candidates;
(b) calculating a norm between a real part of an MDCM signal pair and each of the real symbol vector candidates and generating first calculation results;
(c) calculating a norm between an imaginary part of the MDCM signal pair and each of the imaginary symbol vector candidates and generating second calculation results; and
(d) calculating a log likelihood ratio for each of bits in the MDCM signal pair based on the first calculation results and the second calculation results.

20. The receiver of claim 17, wherein when hard decision demodulation is selected, hard decision demodulation is performed with the following steps:
generating real symbol vector candidates and imaginary symbol vector candidates that correspond to an MDCM signal pair;
calculating a first norm between a real part of the MDCM signal pair and each of the real symbol vector candidates and selecting from among the real symbol vector candidates a real symbol vector candidate that has the minimum first norm as a real symbol vector; and
calculating a second norm between an imaginary part of the MDCM signal pair and each of the imaginary symbol vector candidates and selecting from among the imaginary symbol vector candidates an imaginary symbol vector candidate that has the minimum second norm as an imaginary symbol vector.

* * * * *